United States Patent

[11] 3,586,110

[72] Inventor Richard J. King
 Rockford, Ill.
[21] Appl. No. 763,203
[22] Filed Sept. 27, 1968
[45] Patented June 22, 1971
[73] Assignee J.I. Case Company

[54] TRIP MECHANISM FOR GROUND WORKING IMPLEMENT
 3 Claims, 4 Drawing Figs.
[52] U.S. Cl. ........................................... 172/269
[51] Int. Cl. ........................................... A01b 61/04
[50] Field of Search.................................. 172/269,
 264, 705, 710, 265; 280/455

[56] References Cited
 UNITED STATES PATENTS
1,010,776 12/1911 Langenfeld.................. 172/269 X
2,850,957 9/1958 Silver ............................ 172/269
3,011,565 12/1961 Cahow .......................... 172/269
3,032,122 5/1962 Geurts........................... 172/264
3,302,728 2/1967 Sullivan et al. ................ 172/269

3,439,748 4/1969 Ward............................ 172/269

Primary Examiner—Robert E. Pulfrey
Assistant Examiner—Stephen C. Pellegrino
Attorney—Dressler, Goldsmith, Clement & Gordon ABSTRACT: A tillage implement having a plurality of spaced ground working tools, with safety trip means for each tool allowing the tool to move from a normal ground penetrating position to a position elevated thereabove when an obstruction, such as a rock or a stump, is encountered. Each ground working tool is mounted for free swinging movement between the ground penetrating position and a fully elevated position above the ground, and the tool is positively guided to and from the ground working position, with the guiding means functioning to allow the ground working tool to initially move out of the ground penetrating position without substantial downward movement into the ground, and with the guiding means also functioning to direct the ground working tool back into the ground at the proper angle of reentry. Spring biased latch means releasably retain each of the ground working tools in the operating ground penetrating position.

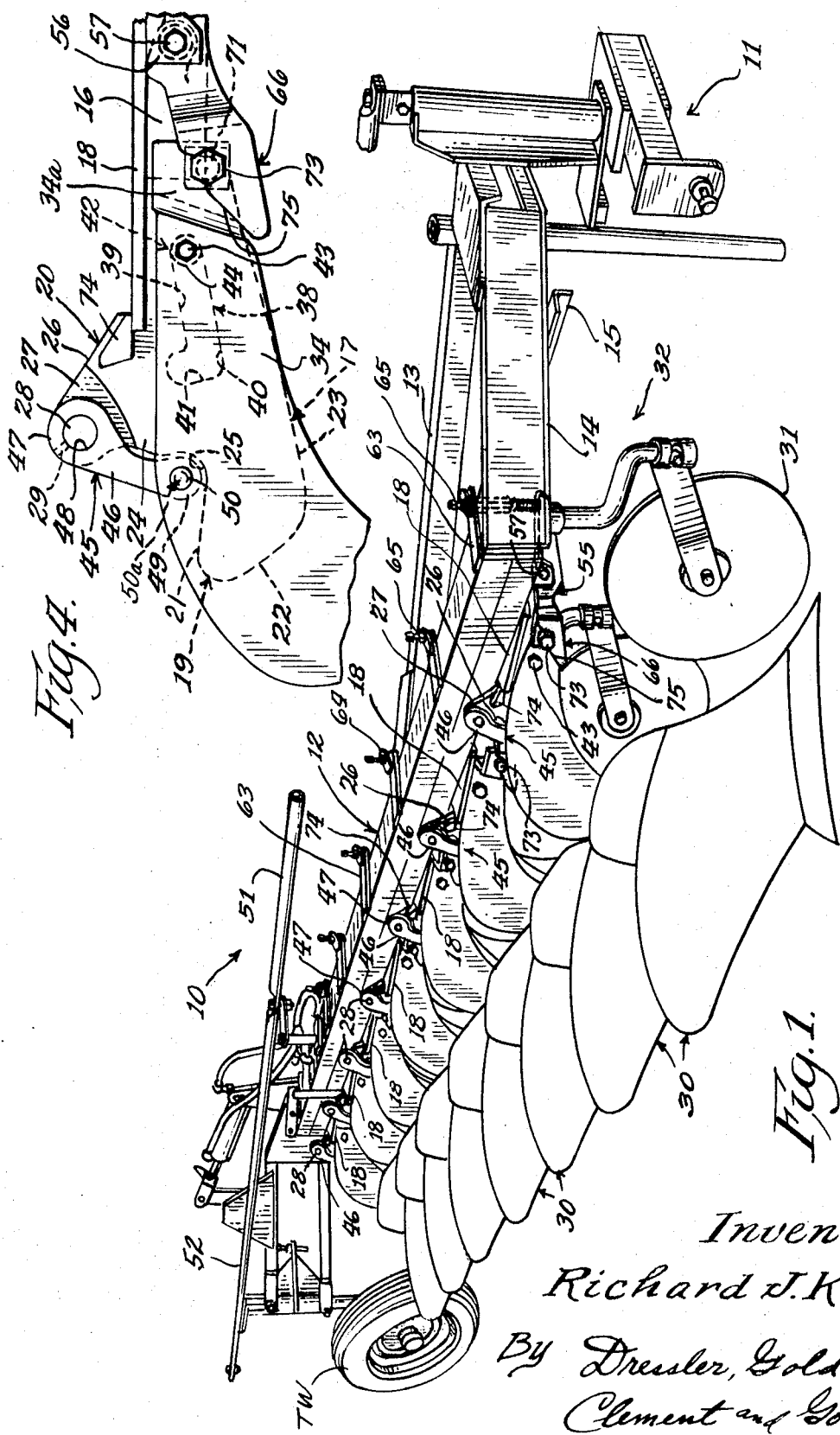

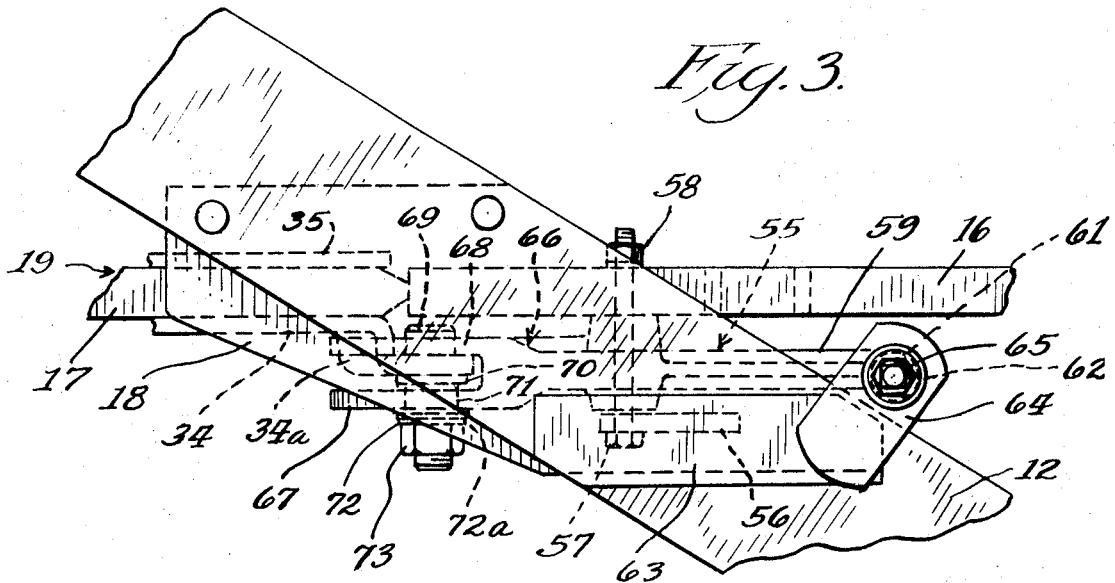
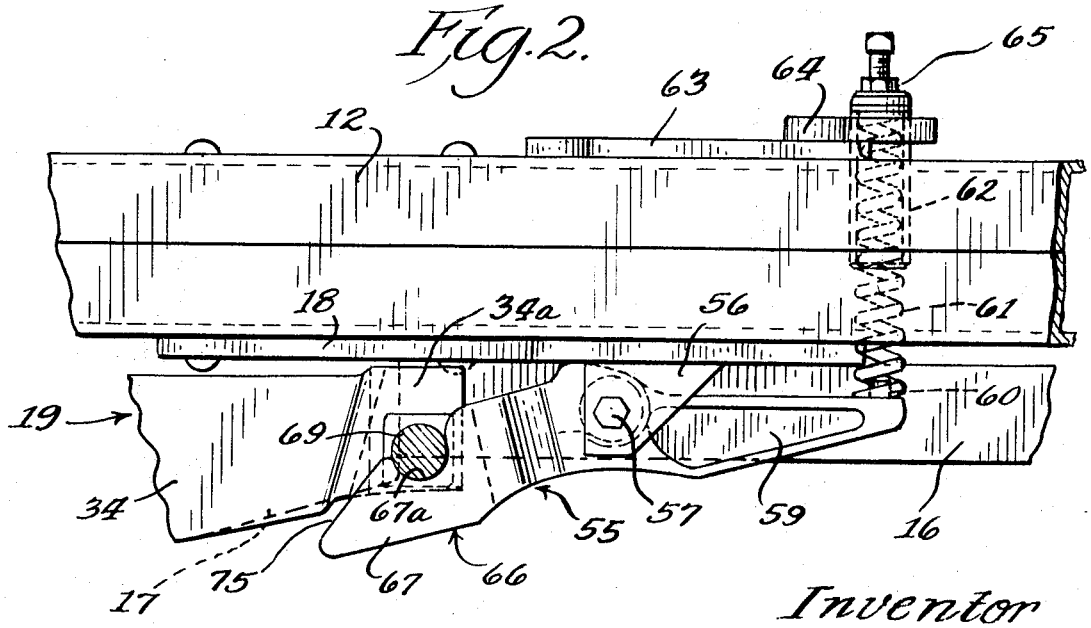

TRIP MECHANISM FOR GROUND WORKING IMPLEMENT

BACKGROUND OF THE INVENTION

Tillage implements having safety trip mechanisms for protecting a ground working tool against damage when an obstruction is encountered have been well known in the past. It is also well known to automatically return the ground working tool from a tripped obstruction clearing position to a normal or operating ground penetrating position by spring means or hydraulic cylinder means, thereby avoiding the necessity of having to stop the tractor and manually reset the tool. Heretofore, no one has provided a versatile implement which can be readily converted from an automatic reset to a manual reset, and vice versa, when desired.

SUMMARY OF THE INVENTION

The safety trip mechanism of the present invention is of the manual reset "high pivot" variety, and may readily be converted to automatic reset mechanism for automatically returning a ground working tool to an operating ground penetrating position. The trip mechanism includes spring biased latch means releasably retaining the ground working tool in an operating ground penetrating position, and linkage means is connected between the ground working tool and the implement frame for allowing the tool to swing to a clearance position when an obstruction is encountered.

BRIEF DESCRIPTION OF THE DRAWINGS

FIG. 1 is a perspective view of a tillage implement utilizing the trip mechanism of the present invention;

FIG. 2 is a fragmentary side elevational view of the latching structure for the trip mechanism of the present invention;

FIG. 3 is a fragmentary top plan view of the structure illustrated in FIG. 1; and FIG. 4 is a side elevational view on a reduced scale illustrating the ground working tool and trip mechanism of the present invention.

DESCRIPTION OF THE PREFERRED EMBODIMENT

While this invention is susceptible of embodiment in many different forms, there is shown in the drawings and will herein be described in detail one specific embodiment, with the understanding that the present disclosure is to be considered as an exemplification of the principles of the invention and is not intended to limit the invention to the embodiment illustrated. The scope of the invention will be pointed out in the appended claims.

Referring now to the drawings in detail, the trip mechanism of the present invention is illustrated in use with a moldboard plow type of tillage implement 10, it being understood that the trip mechanism could be used with other types of ground working tools. The tillage implement 10 includes a frame structure having a hitch mechanism 11 at the forward end thereof for connection to a tractive vehicle, such as a tractor. The hitch mechanism can be either of the "on-land" or "in-furrow" variety, as will be evident to those skilled in the art. The frame structure further includes a box frame member 12 that is disposed at an angle with respect to the direction of movement of the implement 10, as is well known. A longitudinally extending brace member 13 is secured to an intermediate portion of frame member 12, and extends forwardly therefrom. An inclined front frame member 14 is secured between the forwardmost portions of frame members 12 and 13. A steerable tail wheel TW is provided at the rearward end of frame member 12, and is actuated in a known manner by steering linkage means including steering arms S1 and S2.

The implement 10 includes a subframe structure for mounting a plurality of ground working tools, and the subframe structure includes an inclined frame member 15 (FIG. 1) secured to the lower portion of frame members 13 and 14, with frame member 15 being generally parallel with frame member 12. Each ground working tool is carried by a generally longitudinally extending beam member 16, and each beam member 16 has an extension portion 17 welded, or otherwise suitably secured, to the rearward end thereof. Each beam 16 and its extension 17 are welded to the lower surface of a mounting plate 18, and each mounting plate 18 is bolted, or otherwise suitably secured, to the underside of box frame member 12.

Each beam extension 17 is generally heart shaped, and includes a lower lobe 19 and an upper lobe 20. Lower lobe 19 includes a generally horizontally disposed upper support surface 21, a generally downwardly and forwardly inclined rearward surface 22, and an upwardly and forwardly inclined bottom surface 23.

The upper lobe 20 includes an irregularly curved upwardly extending rearward surface 24 that merges with upper surface 21 of lower lobe 19 at a rounded junction 25. Upper lobe 20 further includes a downwardly and forwardly inclined upper surface 26 that terminates adjacent the upper surface of mounting plate 18. The upper portion 27 of upper lobe 20 is of reduced thickness to provide mounting means for linkage structure to be hereafter described. A transversely extending opening is provided in lobe portion 27 and a smooth, low friction bearing pin 28 is fixed therein by a setscrew 29, or the like.

The present invention is illustrated in use with ground working tools in the form of moldboard plow bottoms 30 (FIG. 1), and trash cutting coulters 31 may be secured in cooperative relationship with bottoms 30 by suitable support structure 32. Each bottom 30 is secured to a plow standard that is connected between a pair of spaced parallel side plates 34 and 35, and each side plate 34 includes a laterally offset forward portion 34a. Side plates 34 and 35 are positioned in sliding, face abutting engagement with opposite sides of beam extension 17 and derive lateral support therefrom.

Cooperating structure is provided on each ground working tool and its supporting frame for not only mounting the tool on the frame, but also for constraining the tool for movement along a desired path relative to the frame. Said means includes an internal cam in the form of a longitudinally extending, slightly downwardly inclined slot 38 in beam extension 17. Slot 38 includes a generally rectilinear upper surface 39 which functions as a cam surface, and a generally rectilinear lower surface 40 which functions as a guiding surface. An upwardly extending notch 41 is provided at the rearward end of cam surface 39, and notch 41 is inclined slightly rearwardly. Cam follower means 42 is fixedly associated with each ground working tool 30, and the cam follower means 42 includes a roller 44 that is secured to the unthreaded central portion of a bolt 43, or other suitable pivot member, that extends between side plates 34 and 35, with roller 44 being disposed in slot 38 for movement therealong.

The mounting and guiding structure for each ground working tool 30 further includes coordinating linkage means 45, which cooperates with the cam 38 and cam follower means 42 to ensure that each ground working tool moves away from the ground penetrating position along a shallow flat arc, and moves back into the ground penetrating position along the same arc. The coordinating linkage means 45 is in the form of a single link 46 that is connected between the beam extension 17 and the ground working tool 30. The link 46 has a bifurcated first end that defines spaced parallel ears 47 having opposed surfaces in face abutting engagement with opposite sides of the reduced portion 27 of lobe 20. Aligned openings 48 are provided in ears 47, and are journaled upon the outer ends of pivoted pin 28. The second end 49 of link 46 remote from ears 47 is rounded to seat within junction 25, when the ground working tool is in the ground penetrating position. A pivot pin 50 extends transversely through the end 49 of link 46, with the ends of pin 50 being received in aligned openings 50a in side plates 34 and 35.

Latch means are provided for releasably retaining each of the ground working tools 30 in the normal ground penetrating position and to this end, a latch member 55 is pivotally mounted to the implement frame for each of the ground working tools. A support member 56 extends downwardly from mounting plate 18, and a pivot bolt 57 impales aligned openings in the midportion of latch member 55, support member 56, and beam 16. A nut 58 (FIG. 3) is threaded upon the outer end of bolt 57 to retain the elements in assembled relation.

Latch members 55 are identically shaped, and include a forwardly extending portion 59 having an upwardly extending spring seat 60 at the forwardmost end thereof. A compression spring 61 is biased between each latch member 55 and the implement frame, and the lower end of spring 61 is mounted upon spring seat 60, with the upper end of spring 61 being received in a deflection controlling tubular sleeve 62.

Mounting plates 63 are bolted, or otherwise suitably secured, at spaced locations to the upper surface of frame member 12, and the upper end of each sleeve 62 is secured to a carrier plate 64 that extends at an angle to the forward end of its respective mounting plate 63. An adjusting nut 65 is provided for moving sleeve 62 downwardly to adjust and control the compressive force of spring 61.

Latch members 55 each include a rearwardly extending portion 66 that is bifurcated to provide spaced jaws 67 and 68. As is evident from FIG. 3, the offset end 34a of each side plate 34 is received between a set of jaws 67 and 68. Jaws 67 and 68 include upwardly opening detent notches, the detent notch 67a for jaw 67 being illustrated in FIG. 2. A round head bolt 69 seats within the detent notches, and extends through an opening in plate portion 34a that is aligned with the detent notches in the normal ground penetrating position of the tool. The rounded head of bolt 69 is seated within the detent notch of jaw 68; and the shank of bolt 69 extends through a bearing pad 70, surrounding the opening in plate portion 34a, through a bushing 71 that seats in detent notch 67a, and through a flat washer 72 and lock washer 72a. A nut 73 is threaded upon the outer end of bolt 69 to fix the bolt 69 relative to the side plate 34a.

During normal plowing operation, the latch members 55 function to retain the ground working tools 30 in the normal ground penetrating position. When an unyielding obstruction is encountered by a ground working tool 30, the tool swings upwardly and rearwardly and bolt 69 pivots latch member 55 in a counterclockwise direction about pivot 57 against the bias of spring 61. When the bolt 69 moves out of the detent notches in jaws 67 and 68, the tool 30 is free to swing in a rearward and upward direction relative to the implement frame about link 46. Stop plates 74 are fixed to opposite sides of each extension 17, and are positioned in the path of movement of side plates 34 and 35 to prevent the tool 30 from going over center.

When it is desired to reposition the tripped ground working tool in the normal ground penetrating position, the tool is moved downwardly as link 46 pivots, and bolt 69 engages an upwardly and forwardly inclined cam surface 75 on the upper surface of the rearward end of jaws 67 and 68, and this engagement pivots the latch member 55 in a counterclockwise direction about 57 against the bias of spring 61 to enable the bolt 69 to move into engagement with the detent notches.

What I claim is:

1. A tillage implement comprising:
   a frame;
   a ground working tool;
   means mounting said tool on said frame for movement away from an operating ground penetrating position toward a fully elevated position above the ground, said mounting means guiding said tool during movement between said positions;
   said mounting and guiding means including linkage means in the form of a single link pivotally connected at one end to said frame and pivotally connected at the other end to said tool, and a slotted cam surface in said frame with a follower means on said tool engaging said cam surface, said tool having an abutment thereon defined by a pin extending transversely of the tool adjacent the forward end thereof and spaced from said follower means;
   latch means releasably retaining said ground working tool in said ground penetrating position, said latch means including a latch member having its midportion pivotally mounted on said frame forwardly of said tool, said latch member having a detent surface formed by an upwardly facing notch in a portion of the latch member rearwardly of its pivot axis, said notch being engageable with said pin; and
   resilient means defined by a generally vertically disposed compression spring bearing against the upper surface of a portion of the latch member forwardly of its pivot axis for releasably biasing said latch means into retentive engagement with said pin.

2. A tillage implement as set forth in claim 1 including means for adjusting the bias of said spring.

3. A tillage implement as set forth in claim 1 wherein a downwardly inclined cam surface is provided on the first portion of said latch member rearwardly of said detent surface.